United States Patent
Lu et al.

(10) Patent No.: US 12,202,739 B2
(45) Date of Patent: Jan. 21, 2025

(54) MANGANESE-DOPED COBALTOSIC TETROXIDE AND PREPARATION METHOD AND APPLICATION THEREOF

(71) Applicants: Guangdong Brunp Recycling Technology Co., Ltd., Foshan (CN); Hunan Brunp Recycling Technology Co., Ltd., Changsha (CN)

(72) Inventors: Xinghua Lu, Foshan (CN); Changdong Li, Foshan (CN); Dingshan Ruan, Foshan (CN); Genghao Liu, Foshan (CN); Siyuan Zhou, Foshan (CN); Haihan Hu, Foshan (CN)

(73) Assignees: Guangdong Brunp Recycling Technology Co., Ltd., Foshan (CN); Hunan Brunp Recycling Technology Co., Ltd., Changsha (CN)

( * ) Notice: Subject to any disclaimer, the term of this patent is extended or adjusted under 35 U.S.C. 154(b) by 0 days.

(21) Appl. No.: 18/284,640

(22) PCT Filed: Sep. 22, 2022

(86) PCT No.: PCT/CN2022/120644
§ 371 (c)(1),
(2) Date: Sep. 28, 2023

(87) PCT Pub. No.: WO2024/016469
PCT Pub. Date: Jan. 25, 2024

(65) Prior Publication Data
US 2024/0270598 A1 Aug. 15, 2024

(30) Foreign Application Priority Data
Jul. 22, 2022 (CN) .......................... 202210880798.8

(51) Int. Cl.
*C01G 51/04* (2006.01)
*C01G 51/00* (2006.01)

(52) U.S. Cl.
CPC .......... *C01G 51/54* (2013.01); *C01P 2002/54* (2013.01)

(58) Field of Classification Search
CPC ...... H01M 4/525; H01M 4/505; H01M 4/628; H01M 2004/028; H01M 10/0525; Y02E 60/10; C01P 2004/54; C01P 2004/61; C01P 2004/028; C01P 2004/80; C01P 2004/03; C01P 2006/40; C01G 51/04
See application file for complete search history.

(56) References Cited

FOREIGN PATENT DOCUMENTS

| | | |
|---|---|---|
| CN | 103818972 A | 5/2014 |
| CN | 107381660 A | 11/2017 |
| CN | 110759387 A | 2/2020 |
| CN | 112142120 A | 12/2020 |
| CN | 114614018 A | 6/2022 |
| JP | 2017-31006 A | 2/2017 |
| JP | 2017-36185 A | 2/2017 |
| WO | 92/21611 A1 | 12/1992 |
| WO | 2022/127129 A1 | 6/2022 |

OTHER PUBLICATIONS

Hu et al (WO2022/127129 A1, see machine translation), publication date Jun. 23, 2022—two copies of machine translation provided.*
Hu et al (WO2022/127129 A1, see machine translation), publication date Jun. 23, 2022—without translation with clear drawings.*
Chen, Huiyu, et al., "Uniform and porous Mn-doped CO3O4 microspheres: Solvothermal systhesis and their superior supercapacitor performance", Ceramics International, Mar. 7, 2020, 7 pages.
PCT Search Report, PCT Application No. PCT/CN2022/120644, dated Apr. 4, 2023, 6 pages.
PCT Written Opinion, PCT Application No. PCT/CN2022/120644, dated Apr. 4, 2023, 6 pages.
Chinese Office Action, Application No. 202210880798.8, dated Apr. 14, 2023, 6 pages.
Chinese Search Report, Application No. 202210880798.8, dated Apr. 10, 2023, 5 pages.

* cited by examiner

*Primary Examiner* — Smita S Patel
(74) *Attorney, Agent, or Firm* — Leason Ellis LLP

(57) ABSTRACT

Disclosed are a manganese-doped cobaltosic tetroxide, and a preparation method and application thereof, belonging to the field of battery materials. The preparation method of the manganese-doped cobaltosic tetroxide of the disclosure dopes a manganese element into cobalt carbonate with a specific process and matched with a composite surfactant, which can obtain manganese-doped cobaltosic tetroxide particle products with uniform particle size, dispersion and fineness through high-temperature sintering, a proportion of low-valence manganese in the doped manganese is high, and a crystal form of the products obtained by sintering is complete. The preparation method is simple in operation and can realize industrial large-scale production. The manganese-doped cobaltosic tetroxide prepared by the preparation method and the application thereof are also disclosed.

16 Claims, 4 Drawing Sheets

_US 12,202,739 B2_

MANGANESE-DOPED COBALTOSIC TETROXIDE AND PREPARATION METHOD AND APPLICATION THEREOF

CROSS-REFERENCE TO RELATED APPLICATION

This application is a national stage filing under 35U.S.C. § 371 of international application number PCT/CN2022/120644, filed Sep. 22, 2022, which claims priority to Chinese patent application No. 202210880798.8 filed Jul. 22, 2022. The contents of these applications are incorporated herein by reference in their entirety.

TECHNICAL FIELD

The present disclosure belongs to the technical field of battery materials, and particularly relates to a manganese-doped cobaltosic tetroxide and a preparation method and application thereof.

BACKGROUND

Lithium cobaltate positive material is mainly used in 3C field due to the high energy density thereof. In order to improve a charging and discharging life of a battery, in the existing technology, other metal elements are commonly used to replace part of cobalt to improve performances of lithium ion batteries of lithium cobaltate series. Due to the large reserves of manganese ores in China, the relatively low price and low toxicity of manganese, and spinel-type lithium manganate is also a layered compound, which can intercalate and deintercalate lithium ions, there are many technical researches on manganese-doped lithium cobaltate at present, and this product can significantly improve the capacity of the lithium ion batteries. Meanwhile, manganese doping can enhance the order of cations, inhibit the disorder of cations, and also improve a cycle property of the battery.

Generally, lithium cobaltate is doped with manganese in a precursor stage. As a precursor of a lithium cobaltate positive material, cobaltosic oxide is generally prepared by thermal decomposition of cobalt carbonate, and manganese carbonate is generally used as a raw material for manganese doping. However, because a solubility product of the manganese carbonate is smaller than that of the cobalt carbonate, if wet coprecipitation is used for doping, agglomeration will easily occur, resulting in a wide particle size distribution of the precursor. At the same time, divalent manganese is easily oxidized to trivalent or tetravalent, while the low sintering activity of tetravalent manganese leads to the difficulty of primary particle growth, which inhibits the fusion growth between particles, which is not conducive to prepare a manganese-doped cobaltosic oxide with a complete crystal form.

SUMMARY

Based on the defects in the existing technology, the present disclosure aims to provide a preparation method of a manganese-doped cobaltosic tetroxide, which dopes a manganese element into cobalt carbonate with a specific process and matched with a composite surfactant, which can obtain manganese-doped cobaltosic tetroxide particle products with uniform particle size, dispersion and fineness through high-temperature sintering, where a proportion of low-valence manganese in the doped manganese is high, and a crystal form of the products obtained by sintering is complete. The preparation method is simple in operation and can realize industrial large-scale production.

To achieve the above object, the technical solutions adopted by the present disclosure are as follows:

A preparation method of a manganese-doped cobaltosic tetroxide includes the following steps of:

(1) preparing an ammonium bicarbonate solution as a base solution in a reaction vessel under a protective atmosphere and a pressure of 0.1 MPa to 0.5 MPa, where a volume ratio of the base solution in the reaction vessel is 40% to 50%, and a pH value is 8 to 8.5;

(2) adding a mixed metallic solution and a precipitant into the reaction vessel in a steady pressure state for mixing, controlling a pH of the obtained mixed solution to decrease at a rate of 0.08 pH/h to 0.12 pH/h to a pH of 7.3 to 7.6 for reaction until a volume ratio of the mixed solution in the reaction vessel reaches 70% to 80%, and the mixed solution starts to concentrate and precipitate; during the concentration and precipitation period, continuously introducing the mixed metallic solution and the precipitant to steady the volume ratio of the mixed solution in the reaction vessel; and stopping the reaction when a particle size of particles obtained by concentration and precipitation reaches 4 μm to 6 μm to obtain a manganese-doped cobalt carbonate particle slurry; where the mixed metallic solution includes a cobalt salt, a divalent manganese salt, a crown ether surfactant and a nonionic surfactant, and a mass ratio of the crown ether surfactant to the nonionic surfactant and the manganese in the divalent manganese salt is (0.02 to 0.08):(0.02 to 0.08): 1;

(3) after filtering the manganese-doped cobalt carbonate particle slurry, washing with an antioxidant solution for 10 minutes to 30 minutes, then drying and sieving to obtain a manganese-doped cobalt carbonate precursor; and (4) sintering the manganese-doped cobalt carbonate precursor at 650° C. to 680° C. for 3 hours to 5 hours to obtain the manganese-doped cobaltosic tetroxide.

Preferably, the protective atmosphere is nitrogen.

In the preparation method of the manganese-doped cobaltosic tetroxide according to the present disclosure, the protective atmosphere is kept during the preparation of the base solution and the mixing of the reaction solution, and the pressure in the reaction vessel is controlled at the same time, so that oxidation of divalent manganese elements in the mixed metallic solution can be avoided, a reaction activity of each reactant can be increased, a Brownian movement rate of solute molecules can be accelerated, and the metallic cobalt is controlled to be uniformly and completely precipitated. If the pressure of the reaction vessel is not properly controlled, it will not only easily cause the oxidation of the divalent manganese, but even cause safety problems. On the other hand, when the volume proportion in the reaction vessel is too small, a utilization rate of the reaction vessel will be reduced, but if the volume proportion is too large, there will be potential safety hazards. A change rate of the pH in the reaction vessel has a certain influence on crystal nucleus morphology and a precipitation rate of the reaction product, so the change rate needs to be maintained in a specific range.

On the other hand, in the reaction process, besides the basic reaction substances, the present disclosure also introduces two surfactants with a specific ratio for matching, where the crown ether surfactant has a cavity structure formed by macrocyclic ligands, and can effectively generate complexes with metal ions, thus slowing down a precipitation rate of metal ions and contributing to the steady progress of a concentration and precipitation reaction. However, the surfactant is easy to react with protective atmosphere such as nitrogen to generate a large number of bubbles during the reaction, which will not only cause a liquid level and a volume of the reaction vessel to be difficult to control during the reaction, but also affect the precipitation rate and appearance quality of local reaction precipitation particles, resulting in a large number of small crystal nuclei. However, the nonionic surfactant has a certain defoaming effect. When it is used in combination with the crown ether surfactant, a bubble effect can be eliminated, and the amount of water adsorbed on surfaces of precipitated particles which can be replaced by the two surfactants in the concentration and precipitation reaction stage can be greatly increased, thus reducing a capillary force caused by particle coalescence. At the same time, hydroxyl groups adsorbed on the surfaces of the particles are replaced by organic molecular groups, which increase the steric hindrance between particles. According to the present disclosure, through the double effects of reducing the capillary force and increasing the steric hindrance, agglomeration among the particles is effectively relieved, and generation of coarse particles is reduced, while other surfactants are difficult to achieve the same effect. In addition, if a proportion of the two surfactants is not proper, the final product particles will agglomerate or have different shapes.

Finally, before sintering, the present disclosure also uses the antioxidant solution to wash the precipitated manganese-doped cobalt carbonate particles. This step can effectively reduce an oxidation probability of the divalent manganese element, and further avoid that the primary particles are difficult to grow and bond in the sintering process, and a secondary ball structure is loose, and finally sintered manganese-doped cobaltosic tetroxide secondary ball particles are poor in particle quality and easy to be destroyed in appearance due to a high content of high-valence manganese elements in the sintering precursor.

Preferably, a molar concentration of the cobalt salt in the mixed metallic solution is 1.5 mol/L to 2 mol/L, and a mass ratio of the manganese element to the cobalt element is (0.005 to 0.012): 1.

More preferably, the cobalt salt is at least one of cobalt chloride, cobalt sulfate or cobalt nitrate; and the divalent manganese salt is at least one of manganese chloride, manganese sulfate or manganese nitrate.

Preferably, the crown ether surfactant is at least one of 15-crown-5, 18-crown-6 or dibenzo-18-crown-6; and the nonionic surfactant is an HL-610 nonionic surfactant.

Upon screening, all the above-mentioned crown ether surfactants can effectively complex metal ions in the reaction process, avoid segregation of manganese ions, and improve a uniform dispersion degree of the manganese-doped cobaltosic tetroxide obtained. If other surfactants are used, the final product will have different particle sizes. However, the use of the crown ether defoamers needs to be combined with the nonionic surfactants such as HL-610 to maintain the stability of the reaction system and avoid the widening of the particle size distribution of the product.

Preferably, the precipitant is an ammonium bicarbonate solution with a molar concentration of 2 mol/L to 3 mol/L.

Preferably, the base solution in the step (1) has a molar concentration of 1.3 mol/L to 1.8 mol/L and a temperature of 30° C. to 35° C.

Preferably, a stirring rate in the step (2) is 450 rpm to 600 rpm, and a flow rate of adding the mixed metallic solution in the reaction vessel is 2 L/h to 3 L/h.

Under the reaction conditions, the production efficiency of the product in the preparation process is higher and the reaction is more uniform.

Preferably, a mass concentration of the antioxidant solution in the step (3) is 8 wt % to 12 wt %, and the antioxidant is a water-soluble antioxidant, and more preferably at least one of ascorbic acid, disodium edetate or hydrazine hydrate.

Another object of the present disclosure is to provide a manganese-doped cobaltosic tetroxide prepared by the preparation method of the manganese-doped cobaltosic tetroxide.

The manganese-doped cobaltosic tetroxide prepared by the preparation method of the present disclosure has narrow particle size distribution, uniform appearance and small size, and the mass ratio of low-valence manganese in the manganese elements is relatively high, where the mass ratio of the divalent manganese can basically reach about 50 wt %, and the product quality is high.

Yet another object of the present disclosure is to provide an application of the manganese-doped cobaltosic tetroxide in preparing a lithium cobaltate-doped positive material.

The manganese-doped cobaltosic tetroxide of the present disclosure has uniform particle size, high dispersibility and high content of low-valence component in the doped manganese elements, and has good use effects and high commercial values whether it is further directly prepared into the lithium cobaltate doped positive material or further modified before preparation.

The present disclosure has the beneficial effects that the present disclosure provides the preparation method of the manganese-doped cobaltosic tetroxide, which dopes the manganese element into cobalt carbonate with the specific process and matched with the composite surfactant, which can obtain the manganese-doped cobaltosic tetroxide particle products with uniform particle size, dispersion and fineness through high-temperature sintering, where the proportion of the low-valence manganese in the doped manganese is high, and the crystal form of the products obtained by sintering is complete. The preparation method is simple in operation and can realize industrial large-scale production.

DETAILED DESCRIPTION

Figure 1:
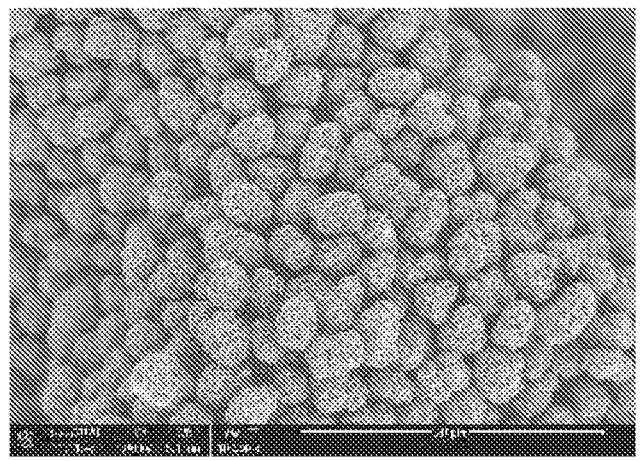
FIG. 1 is a scanning electron microscope of a manganese-doped cobaltosic tetroxide obtained in Embodiment 1 of the present disclosure.

In order to better explain the objects, technical solutions and advantages of the present disclosure, the present disclosure will be further explained with reference to specific embodiments and comparative examples, with the aim of understanding the content of the present disclosure in detail, but not limiting the present disclosure. All other embodiments obtained by those having ordinary skills in the art without paying creative work belong to the protection scope of the present disclosure. Unless otherwise specified, the experimental reagents, raw materials and instruments designed in the embodiments and comparative examples of the present disclosure are all common reagents, raw materials and instruments.

Embodiment 1

An embodiment of a manganese-doped cobaltosic tetroxide and a preparation method and application thereof of the disclosure was provided, where the method included the following steps of:
(1) preparing an ammonium bicarbonate aqueous solution with a concentration of 1.3 mol/L as a base solution in a reaction vessel under a protective atmosphere and a pressure of 0.5 MPa, where a volume ratio of the base solution in the reaction vessel was 40%, a pH value was 8, and a temperature was 30° C.; and after the temperature was stable, continuously introducing nitrogen for 30 minutes under a steady pressure;
(2) adding a mixed metallic solution and a precipitant into the reaction vessel at a flow rate of 2.5 L/h in a steady pressure state, mixing at a rate of 500 rpm, controlling a pH of the obtained mixed solution to decrease at a rate of 0.1 pH/h to a pH of 7.3 through a PLC system for reaction until a volume ratio of the mixed solution in the reaction vessel reaches 70% to 80%, and the mixed solution starts to concentrate and precipitate; during the concentration and precipitation period, continuously introducing the mixed metallic solution and the precipitant to steady the volume ratio of the mixed solution in the reaction vessel; and stopping the reaction when a particle size of particles obtained by concentration and precipitation reached 4.1 μm to obtain a manganese-doped cobalt carbonate particle slurry; the mixed metallic solution was a mixed aqueous solution of cobalt chloride, manganese chloride, 15-crown-5 and HL-610 nonionic surfactant, a concentration of cobalt ions in the mixed metallic solution was 2 mol/L, a mass ratio of the manganese element to the cobalt element was 0.005:1, and a mass ratio of the 15-crown-5 to the HL-610 nonionic surfactant and the manganese element was 0.02:0.02:1; and the precipitant was 3 mol/L ammonium bicarbonate aqueous solution;
(3) after filtering the manganese-doped cobalt carbonate particle slurry, washing with 10 wt % ascorbic acid aqueous solution for 20 minutes, then drying and sieving to obtain a manganese-doped cobalt carbonate precursor; and
(4) heating the manganese-doped cobalt carbonate precursor to 650° C. in a box furnace and sintering for 3 hours, thus obtaining the manganese-doped cobaltosic tetroxide.

Embodiment 2

An embodiment of a manganese-doped cobaltosic tetroxide and a preparation method and application thereof of the disclosure was provided, where the method included the following steps of:
(1) preparing an ammonium bicarbonate aqueous solution with a concentration of 1.5 mol/L as a base solution in a reaction vessel under a protective atmosphere and a pressure of 0.3 MPa, where a volume ratio of the base solution in the reaction vessel was 45%, a pH value was 8.2, and a temperature was 32° C.; and after the temperature was stable, continuously introducing nitrogen for 20 minutes under a steady pressure;
(2) adding a mixed metallic solution and a precipitant into the reaction vessel at a flow rate of 3 L/h in a steady pressure state, mixing at a rate of 520 rpm, controlling a pH of the obtained mixed solution to decrease at a rate of 0.1 pH/h to a pH of 7.4 through a PLC system for reaction until a volume ratio of the mixed solution in the reaction vessel reaches 70% to 80%, and the mixed solution starts to concentrate and precipitate; during the concentration and precipitation period, continuously introducing the mixed metallic solution and the precipitant to steady the volume ratio of the mixed solution in the reaction vessel; and stopping the reaction when a particle size of particles obtained by concentration and precipitation reached 5 μm to obtain a manganese-doped cobalt carbonate particle slurry; the mixed metallic solution was a mixed aqueous solution of cobalt nitrate, manganese nitrate, 18-crown-6 and HL-610 nonionic surfactant, a concentration of cobalt ions in the mixed metallic solution was 1.8 mol/L, a mass ratio of the manganese element to the cobalt element was 0.008:1, and a mass ratio of the 18-crown-6 to the HL-610 nonionic surfactant and the manganese element was 0.04:0.04:1; and the precipitant was 2.5 mol/L ammonium bicarbonate aqueous solution;
(3) after filtering the manganese-doped cobalt carbonate particle slurry, washing with 10 wt % disodium edetate aqueous solution for 20 minutes, then drying and sieving to obtain a manganese-doped cobalt carbonate precursor; and
(4) heating the manganese-doped cobalt carbonate precursor to 665° C. in a box furnace and sintering for 4 hours, thus obtaining the manganese-doped cobaltosic tetroxide.

Embodiment 3

An embodiment of a manganese-doped cobaltosic tetroxide and a preparation method and application thereof of the disclosure was provided, where the method included the following steps of:
(1) preparing an ammonium bicarbonate aqueous solution with a concentration of 1.8 mol/L as a base solution in a reaction vessel under a protective atmosphere and a pressure of 0.1 MPa, where a volume ratio of the base solution in the reaction vessel was 50%, a pH value was 8.4, and a temperature was 35° C.; and after the temperature was stable, continuously introducing nitrogen for 15 minutes under a steady pressure;

(2) adding a mixed metallic solution and a precipitant into the reaction vessel at a flow rate of 2 L/h in a steady pressure state, mixing at a rate of 600 rpm, controlling a pH of the obtained mixed solution to decrease at a rate of 0.1 pH/h to a pH of 7.6 through a PLC system for reaction until a volume ratio of the mixed solution in the reaction vessel reaches 70% to 80%, and the mixed solution starts to concentrate and precipitate; during the concentration and precipitation period, continuously introducing the mixed metallic solution and the precipitant to steady the volume ratio of the mixed solution in the reaction vessel; and stopping the reaction when a particle size of particles obtained by concentration and precipitation reached 5.8 μm to obtain a manganese-doped cobalt carbonate particle slurry; the mixed metallic solution was a mixed aqueous solution of cobalt sulfate, manganese sulfate, dibenzo-18-crown-6 and HL-610 nonionic surfactant, a concentration of cobalt ions in the mixed metallic solution was 1.5 mol/L, a mass ratio of the manganese element to the cobalt element was 0.012:1, and a mass ratio of the dibenzo-18-crown-6 to the HL-610 nonionic surfactant and the manganese element was 0.06:0.06:1; and the precipitant was 2 mol/L ammonium bicarbonate aqueous solution;

(3) after filtering the manganese-doped cobalt carbonate particle slurry, washing with 10 wt % hydrazine hydrate solution for 20 minutes, then drying and sieving to obtain a manganese-doped cobalt carbonate precursor; and (4) heating the manganese-doped cobalt carbonate precursor to 665° C. in a box furnace and sintering for 4 hours, thus obtaining the manganese-doped cobaltosic tetroxide.

Comparative Example 1

The only difference between this comparative example and Embodiment 2 was that the preparation method of the product included the following steps of:

(1) preparing an ammonium bicarbonate aqueous solution with a concentration of 1.5 mol/L as a base solution in a reaction vessel with an air atmosphere and a pressure of 0.3 MPa, where a volume ratio of the base solution in the reaction vessel was 45%, a pH value was 8.2, and a temperature was 32° C.; and after the temperature was stable, continuously introducing nitrogen for 20 minutes under a steady pressure;

(2) adding a mixed metallic solution and a precipitant into the reaction vessel at a flow rate of 3 L/h in a steady pressure state, mixing at a rate of 520 rpm, controlling a pH of the obtained mixed solution to decrease at a rate of 0.1 pH/h to a pH of 7.4 through a PLC system for reaction until a volume ratio of the mixed solution in the reaction vessel reaches 70% to 80%, and the mixed solution starts to concentrate and precipitate; during the concentration and precipitation period, continuously introducing the mixed metallic solution and the precipitant to steady the volume ratio of the mixed solution in the reaction vessel; and stopping the reaction when a particle size of particles obtained by concentration and precipitation reached 5 μm to obtain a manganese-doped cobalt carbonate particle slurry; the mixed metallic solution was a mixed aqueous solution of cobalt nitrate, manganese nitrate, 18-crown-6 and HL-610 nonionic surfactant, a concentration of cobalt ions in the mixed metallic solution was 1.8 mol/L, a mass ratio of the manganese element to the cobalt element was 0.008:1, and a mass ratio of the 18-crown-6 to the HL-610 nonionic surfactant and the manganese element was 0.04:0.04:1; and the precipitant was 2.5 mol/L ammonium bicarbonate aqueous solution;

(3) after filtering the manganese-doped cobalt carbonate particle slurry, washing with deionized water for 20 minutes, then drying and sieving to obtain a manganese-doped cobalt carbonate precursor; and (4) heating the manganese-doped cobalt carbonate precursor to 665° C. in a box furnace and sintering for 4 hours, thus obtaining the manganese-doped cobaltosic tetroxide.

Comparative Example 2

The only difference between this comparative example and Embodiment 2 was that the preparation method of the product included the following steps of:

(1) preparing an ammonium bicarbonate aqueous solution with a concentration of 1.5 mol/L as a base solution in a reaction vessel under a protective atmosphere and a pressure of 0.3 MPa, where a volume ratio of the base solution in the reaction vessel was 45%, a pH value was 8.2, and a temperature was 32° C.; and after the temperature was stable, continuously introducing nitrogen for 20 minutes under a steady pressure;

(2) adding a mixed metallic solution and a precipitant into the reaction vessel at a flow rate of 3 L/h in a steady pressure state, mixing at a rate of 520 rpm, controlling a pH of the obtained mixed solution to decrease at a rate of 0.1 pH/h to a pH of 7.4 through a PLC system for reaction until a volume ratio of the mixed solution in the reaction vessel reaches 70% to 80%, and the mixed solution starts to concentrate and precipitate; during the concentration and precipitation period, continuously introducing the mixed metallic solution and the precipitant to steady the volume ratio of the mixed solution in the reaction vessel; and stopping the reaction when a particle size of particles obtained by concentration and precipitation reached 5 μm to obtain a manganese-doped cobalt carbonate particle slurry; the mixed metallic solution was a mixed aqueous solution of cobalt nitrate and manganese nitrate, a concentration of cobalt ions in the mixed metallic solution was 1.8 mol/L, and a mass ratio of the manganese element to the cobalt element was 0.008:1; and the precipitant was 2.5 mol/L ammonium bicarbonate aqueous solution;

(3) after filtering the manganese-doped cobalt carbonate particle slurry, washing with 10 wt % disodium edetate aqueous solution for 20 minutes, then drying and sieving to obtain a manganese-doped cobalt carbonate precursor; and (4) heating the manganese-doped cobalt carbonate precursor to 665° C. in a box furnace and sintering for 4 hours, thus obtaining the manganese-doped cobaltosic tetroxide.

Comparative Example 3

The only difference between this comparative example and Embodiment 1 was that the 15-crown-5 was replaced with the same amount of decyltrimethylammonium chloride.

Comparative Example 4

The only difference between this comparative example and Embodiment 1 was that the HL-610 nonionic surfactant was replaced with the same amount of triethanolamine oleate.

Comparative Example 5

The only difference between this comparative example and Embodiment 1 was that a mass ratio of the 15-crown-5 to the HL-610 nonionic surfactant was 1:2, and the total dosage of the 15-crown-5 and the HL-610 nonionic surfactant was consistent with that of Embodiment 1.

Comparative Example 6

The only difference between this comparative example and Embodiment 1 was that a mass ratio of the 15-crown-5 to the HL-610 nonionic surfactant was 2:1, and the total dosage of the 15-crown-5 and the HL-610 nonionic surfactant was consistent with that of Embodiment 1.

Comparative Example 7

The only difference between this comparative example and Embodiment 3 was that the pressure of the reaction vessel in the step (1) was 0.05 MPa.

Comparative Example 8

The only difference between this comparative example and Embodiment 1 was that the pH decreasing rate of the obtained mixed solution in the step (2) was 0.15 pH/h.

Comparative Example 9

The only difference between this comparative example and Embodiment 1 was that the pH decreasing rate of the obtained mixed solution in the step (2) was 0.05 pH/h.

Effect Example 1

In order to verify the quality of the products prepared by the preparation method of the manganese-doped cobaltosic tetroxide, the particle sizes and element contents of each product were counted, and the valence states of the manganese elements in the products were fitted by XPS analysis and counted. The results are shown in Table 1.

TABLE 1

| Item | D50 (μm) | Span value | Manganese element content (ppm) | $Mn^{2+}$ wt % | $Mn^{3+}$ wt % | $Mn^{4+}$ wt % |
|---|---|---|---|---|---|---|
| Embodiment 1 | 3.5 | 0.65 | 3669 | 55 | 43.5 | 1.5 |
| Embodiment 2 | 4.5 | 0.51 | 5980 | 48 | 49.9 | 2.1 |
| Embodiment 3 | 5.6 | 0.47 | 8728 | 52 | 47.2 | 0.8 |
| Comparative Example 1 | 4.0 | 0.57 | 5945 | 20.4 | 27 | 52.6 |
| Comparative Example 2 | 5.2 | 1.05 | 6017 | 42.7 | 54.5 | 2.8 |
| Comparative Example 3 | 5.1 | 1.12 | 3541 | 25.9 | 31.2 | 42.9 |
| Comparative Example 4 | 3.6 | 1.15 | 3682 | 56 | 42.9 | 1.1 |
| Comparative Example 5 | 3.5 | 0.60 | 3660 | 38 | 35.6 | 26.4 |
| Comparative Example 6 | 3.6 | 0.88 | 3594 | 53.7 | 45.4 | 0.9 |
| Comparative Example 7 | 3.5 | 0.87 | 3646 | 37.8 | 33.5 | 28.7 |
| Comparative Example 8 | 3.5 | 1.21 | 3658 | 52 | 45.8 | 2.2 |
| Comparative Example 9 | 3.5 | 0.53 | 3320 | 54.7 | 42.4 | 2.9 |

Figure 2:
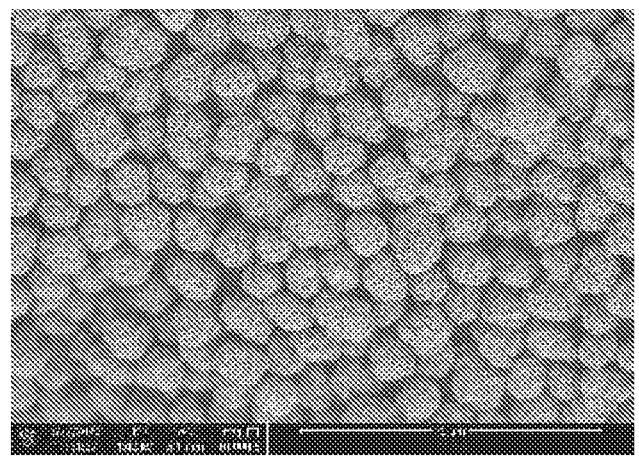
FIG. 2 is a scanning electron microscope of a manganese-doped cobaltosic tetroxide obtained in Embodiment 2 of the present disclosure.
Figure 3:
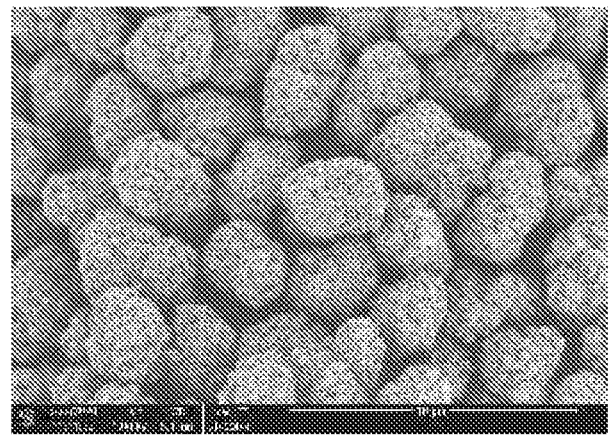
FIG. 3 is a scanning electron microscope of a manganese-doped cobaltosic tetroxide obtained in Embodiment 3 of the present disclosure.
Figure 4:
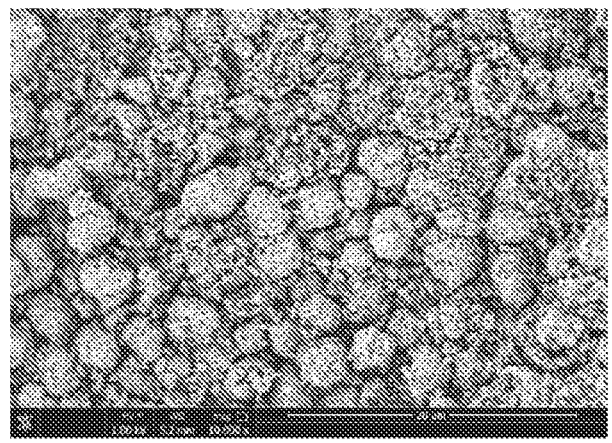
FIG. 4 is a scanning electron microscope of a manganese-doped cobaltosic tetroxide obtained in Comparative Example 1 of the present disclosure.
Figure 5:
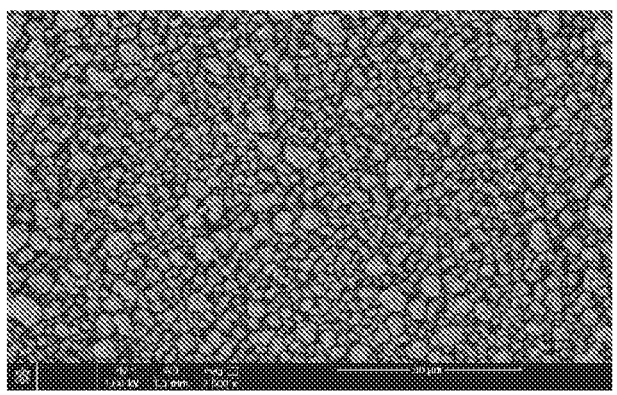
FIG. 5 is a scanning electron microscope of a manganese-doped cobaltosic tetroxide obtained in Comparative Example 2 of the present disclosure.
Figure 6:
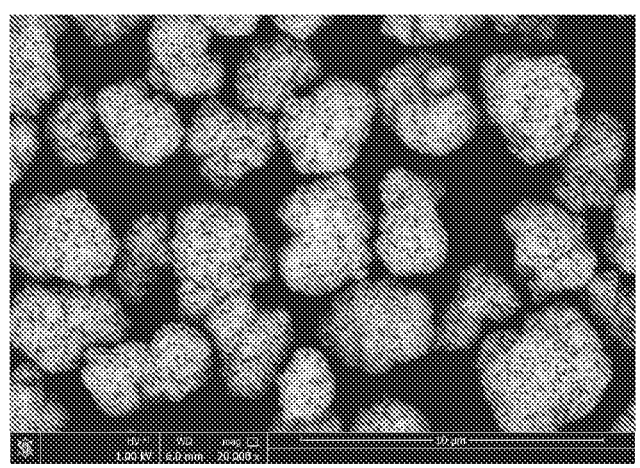
FIG. 6 is a scanning electron microscope of a manganese-doped cobaltosic tetroxide obtained in Comparative Example 3 of the present disclosure.
Figure 7:
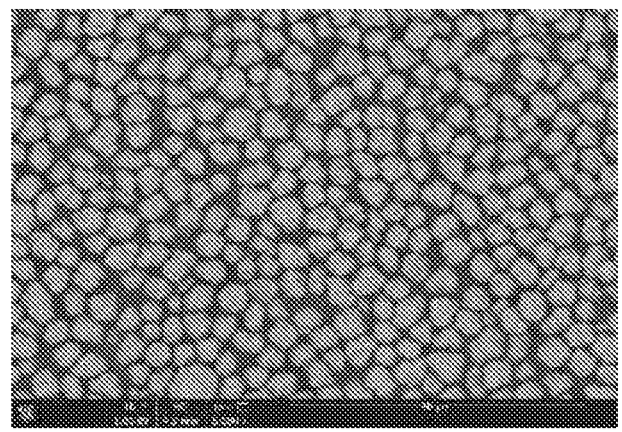
FIG. 7 is a scanning electron microscope of a manganese-doped cobaltosic tetroxide obtained in Comparative Example 4 of the present disclosure.
Figure 8:
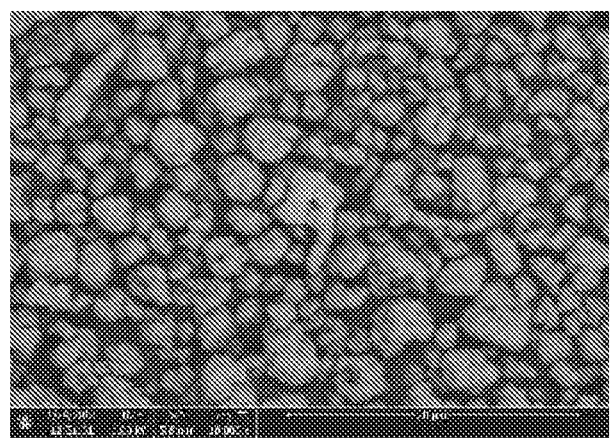
FIG. 8 is a scanning electron microscope of a manganese-doped cobaltosic tetroxide obtained in Comparative Example 5 of the present disclosure.
Figure 9:
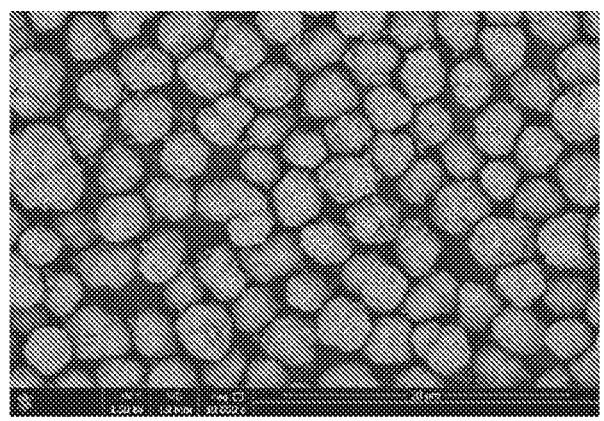
FIG. 9 is a scanning electron microscope of a manganese-doped cobaltosic tetroxide obtained in Comparative Example 6 of the present disclosure.
Figure 10:
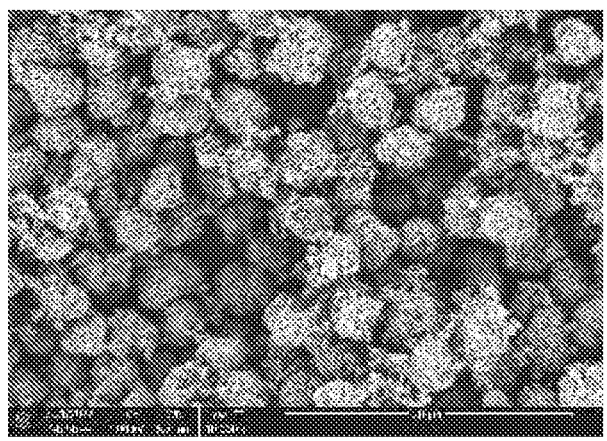
FIG. 10 is a scanning electron microscope of a manganese-doped cobaltosic tetroxide obtained in Comparative Example 7 of the present disclosure.

Meanwhile, the products of each embodiment/comparative example were observed by scanning electron microscope, and the results were shown in FIGS. 1 to 10. According to the data in Table 1 and the scanning electron microscopes, it can be seen that the manganese-doped cobaltosic tetroxide products prepared by the products in each embodiment had uniform and complete particles, high dispersibility, and no obvious crushing phenomenon. The doping amount of manganese was controllable, and the divalent manganese accounted for a relatively high proportion of manganese, which might be as high as 55 wt %. In contrast, in the method of Comparative Example 1, protective atmosphere and antioxidant solution washing were not used to ensure the stability of the bivalent manganese, and the content of the high-valence manganese in the manganese element was relatively high, so that the sintered product particles were crushed and the crystal form was incomplete. No surfactant was introduced into the product of Comparative Example 2 in the preparation process, and the dispersion of the product was poor, resulting in agglomeration. In the steps of the preparation method described in Comparative Example 3, the crown ether surfactant was replaced by other conventional surfactants, which were difficult to play a good role in metal ion complexation in the precursor synthesis process, resulting in segregation of manganese, cause uneven size and wide particle size distribution of the final sintered product. In the preparation method described in Comparative Example 4, the HL-610 nonionic surfactant was replaced with triethanolamine oleate, which could not effectively inhibit the bubble effect caused by the crown ether surfactant. In the reaction process of the reaction vessel, the liquid level fluctuated excessively and the stability was poor, resulting in the manganese-doped cobalt carbonate particles continuously generating new small crystal nuclei in the synthesis process, and the particle size of the final product was uneven. From the product performance results of Comparative Examples 5 and 6, it can be seen that when the crown ether surfactant and the nonionic surfactant were combined at the same time, too much or too little of any one of the two surfactants may lead to the deterioration of the particle growth effect of the product, and the dispersibility and size uniformity might be affected. According to the preparation method of Comparative Example 7, the constant pressure was controlled to be low, and the pressure environment weakened intermolecular Brownian motion, and at the same time, caused insufficient nitrogen, and tetravalent manganese with more components still appeared in the final product, resulting in incomplete product particles. It can also be clearly seen from FIG. 10 that the product particles are damaged. The pH change rate of the preparation method described in Comparative Example 8 was too high in the reaction process of the mixed solution, which directly accelerated the agglomeration phenomenon between the crystal nuclei, resulting in uneven particle size, and a Span value of the product was too large under the same particle size. However, in the preparation method described in Comparative Example 9, the pH change rate was too low. When the liquid level in the reaction vessel reached the level of the concentrated solution, ammonium bicarbonate in the base solution was not completely consumed, and a large number of manganese ammonia complexes existed. As a clear solution generated by concentration was discharged from the reaction system, a manganese content in the final product was lower than a theoretical value.

Finally, it should be noted that the embodiments above are merely used to illustrate the technical solutions of the present disclosure, but are not intended to limit the protection scope of the present disclosure. Although the present disclosure has been described in detail with reference to the preferred embodiments, those skilled in the art should understand that the technical solutions of the present disclosure can be modified or equivalently replaced without departing from the essence and scope of the technical solutions of the present disclosure.

The invention claimed is:

1. A preparation method of a manganese-doped cobaltosic tetroxide, comprising the following steps of:
   (1) preparing an ammonium bicarbonate solution as a base solution in a reaction vessel under a protective atmosphere and a pressure of 0.1 MPa to 0.5 MPa, wherein a volume ratio of the base solution in the reaction vessel is 40% to 50%, and a pH value is 8 to 8.5;
   (2) adding a mixed metallic solution and a precipitant into the reaction vessel in a steady pressure state for mixing, controlling a pH of the obtained mixed solution to decrease at a rate of 0.08 pH/h to 0.12 pH/h to a pH of 7.3 to 7.6 for reaction until a volume ratio of the mixed solution in the reaction vessel reaches 70% to 80%, and the mixed solution starts to concentrate and precipitate; during the concentration and precipitation period, continuously introducing the mixed metallic solution and the precipitant to steady the volume ratio of the mixed solution in the reaction vessel; and stopping the reaction when a particle size of particles obtained by concentration and precipitation reaches 4 µm to 6 µm to obtain a manganese-doped cobalt carbonate particle slurry; wherein the mixed metallic solution comprises a cobalt salt, a divalent manganese salt, a crown ether surfactant and a nonionic surfactant, and a mass ratio of the crown ether surfactant to the nonionic surfactant and a manganese element in the divalent manganese salt is (0.02 to 0.08):(0.02 to 0.08):1;
   (3) after filtering the manganese-doped cobalt carbonate particle slurry, washing with an antioxidant solution for 10 minutes to 30 minutes, then drying and sieving to obtain a manganese-doped cobalt carbonate precursor; and
   (4) sintering the manganese-doped cobalt carbonate precursor at 650° C. to 680° C. for 3 hours to 5 hours to obtain the manganese-doped cobaltosic tetroxide.

2. The preparation method of the manganese-doped cobaltosic tetroxide according to claim 1, wherein a molar concentration of the cobalt salt in the mixed metallic solution is 1.5 mol/L to 2 mol/L, and a mass ratio of the manganese element in the divalent manganese salt to a cobalt element in the cobalt salt is (0.005 to 0.012):1.

3. A manganese-doped cobaltosic tetroxide prepared by the preparation method of the manganese-doped cobaltosic tetroxide according to claim 2.

4. The preparation method of the manganese-doped cobaltosic tetroxide according to claim 1, wherein the cobalt salt is at least one of cobalt chloride, cobalt sulfate or cobalt nitrate; and the divalent manganese salt is at least one of manganese chloride, manganese sulfate or manganese nitrate.

5. A manganese-doped cobaltosic tetroxide prepared by the preparation method of the manganese-doped cobaltosic tetroxide according to claim 4.

6. The preparation method of the manganese-doped cobaltosic tetroxide according to claim 1, wherein the crown ether surfactant is at least one of 15-crown-5, 18-crown-6 or dibenzo-18-crown-6; and the nonionic surfactant is an HL-610 nonionic surfactant.

7. A manganese-doped cobaltosic tetroxide prepared by the preparation method of the manganese-doped cobaltosic tetroxide according to claim 6.

8. The preparation method of the manganese-doped cobaltosic tetroxide according to claim 1, wherein the precipitant is an ammonium bicarbonate solution with a molar concentration of 2 mol/L to 3 mol/L.

9. A manganese-doped cobaltosic tetroxide prepared by the preparation method of the manganese-doped cobaltosic tetroxide according to claim 8.

10. The preparation method of the manganese-doped cobaltosic tetroxide according to claim 1, wherein the base solution in the step (1) has a molar concentration of 1.3 mol/L to 1.8 mol/L and a temperature of 30° C. to 35° C.; and the protective atmosphere is nitrogen.

11. A manganese-doped cobaltosic tetroxide prepared by the preparation method of the manganese-doped cobaltosic tetroxide according to claim 10.

12. The preparation method of the manganese-doped cobaltosic tetroxide according to claim 1, wherein a stirring rate for the mixing in the step (2) is 450 rpm to 600 rpm, and a flow rate of adding the mixed metallic solution in the reaction vessel is 2 L/h to 3 L/h.

13. A manganese-doped cobaltosic tetroxide prepared by the preparation method of the manganese-doped cobaltosic tetroxide according to claim 12.

14. The preparation method of the manganese-doped cobaltosic tetroxide according to claim 1, wherein a mass concentration of the antioxidant solution in the step (3) is 8 wt % to 12 wt %, and the antioxidant solution is a water-soluble antioxidant solution.

15. A manganese-doped cobaltosic tetroxide prepared by the preparation method of the manganese-doped cobaltosic tetroxide according to claim 14.

16. A manganese-doped cobaltosic tetroxide prepared by the preparation method according to claim 1.

* * * * *